United States Patent [19]

Song

[11] Patent Number: 5,589,090
[45] Date of Patent: Dec. 31, 1996

[54] LASER CUTTING APPARATUS WITH MEANS FOR MEASURING CUTTING GROOVE WIDTH

[76] Inventor: Byung-Jun Song, 1209-1404, Jukong Apt., Chulsan-dong, Kwangmyung-city, Kyungki-do, Rep. of Korea

[21] Appl. No.: 376,366

[22] Filed: Jan. 23, 1995

[30] Foreign Application Priority Data

Jan. 31, 1994 [KR] Rep. of Korea .................. 94-1766
Feb. 16, 1994 [KR] Rep. of Korea .................. 94-2713

[51] Int. Cl.$^6$ .................................................. B23K 26/00
[52] U.S. Cl. .......................... 219/121.62; 219/121.67; 219/121.75; 219/121.82
[58] Field of Search .................. 219/121.62, 121.67, 219/121.72, 121.78, 121.79, 121.82, 121.83, 121.39, 121.75

[56] References Cited

U.S. PATENT DOCUMENTS 3,769,488 10/1973 Hasslinger ........................ 219/121.67

FOREIGN PATENT DOCUMENTS 58-47375 10/1984 Japan.
61-22908 8/1987 Japan.
01118716 12/1990 Japan.

Primary Examiner—Mark H. Paschall
Attorney, Agent, or Firm—Watson Cole Stevens Davis, P.L.L.C.

[57] ABSTRACT

A laser cutting apparatus suitable for making a cutting groove into a die-manufacturing plywood used during production of package boxes includes a distance adjuster between an object being processed and a laser condenser lens for adjusting the width of a laser beam irradiating upon the object, a relative-speed regulator for controlling the relative speed of the object with respect to the laser beam to regulate the irradiating time of the laser beam upon the object, a cutting-width measuring unit for measuring the cutting widths of the upper portion and lower portion of the cutting groove, and a controller for comparing the measured cutting width of the cutting groove with a standard dimension and controlling the distance adjuster and relative-speed regulator in accordance with the result of the comparison.

15 Claims, 4 Drawing Sheets

5,589,090

LASER CUTTING APPARATUS WITH MEANS FOR MEASURING CUTTING GROOVE WIDTH

BACKGROUND OF THE INVENTION

1. Field of the Invention

The present invention relates to a laser cutting apparatus, and more particularly to a laser cutting apparatus suitable for making a cutting groove into a die-manufacturing plywood used during the production of package boxes.

2. Description of the Prior Art

Generally, a die for manufacturing boxes is constructed in such a manner that a cutting groove is formed in a plywood, and a cutting knife is fixedly inserted into the cutting groove. Thus, the width of the cutting groove must be precisely processed to correspond to the thickness of the cutting knife, and an excellently precise laser cutting apparatus is employed to make the cutting groove. However, due to the difference of almost all plywood in quality, the width of the cutting groove is liable to be out of a standard dimension. For this reason, a worker measures the cutting width one by one to suspend the cutting-off operation in case of recognizing a portion having a misapplied dimension, which is a very troublesome job. As an ordinary method for checking the cutting width of the plywood, the cutting groove is directly fitted with the cutting knife or measured by a scale ruler. These methods for checking the cutting width require the worker to continuously watch out the cutting width, thereby wasting manpower and time. Moreover, the accuracy of examination is lowered owing to the manual operation.

SUMMARY OF THE INVENTION

It is an object of the present invention to provide a laser cutting apparatus capable of automatically making a cutting groove of precise width in an object such as plywood to be processed.

To achieve the above object according to the present invention, there is provided a laser cutting apparatus which includes a laser oscillator for generating a laser beam and a laser condenser lens for condensing the laser beam from the laser oscillator to make a cutting groove of predetermined width into an object being processed, the laser cutting apparatus comprises a distance adjuster between the object and laser condenser lens for adjusting the width of the laser beam irradiated upon the object; a relative-speed regulator for controlling a relative speed of the object with respect to the laser beam to regulate the irradiating time of the laser beam upon the object; a cutting-width measuring unit for measuring the cutting widths of the upper portion and lower portion of the cutting groove; and a controller for comparing the measured cutting width of the cutting groove with a standard dimension to control the distance adjuster and relative-speed regulator as the result of comparison.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
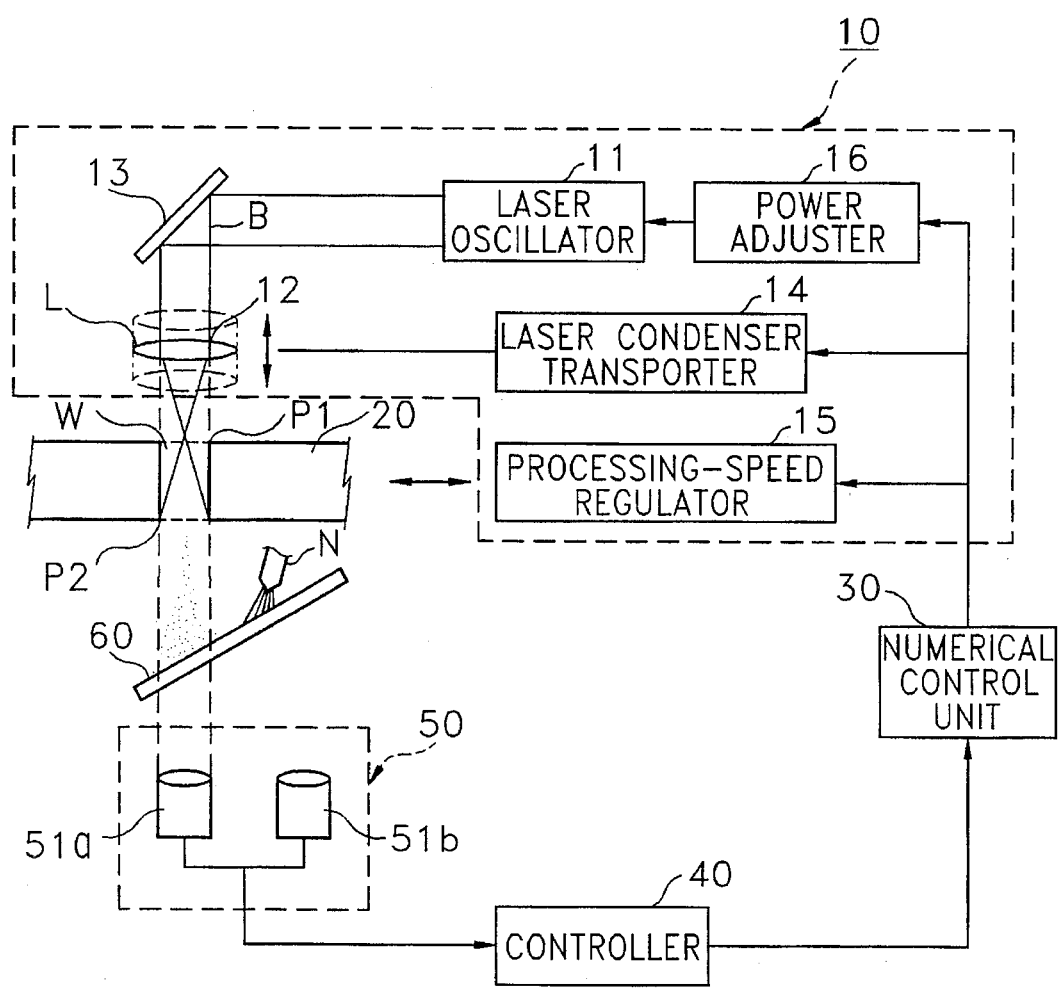
FIG. 1 is a block diagram showing one embodiment of a laser cutting apparatus according to the present invention.

Referring to FIG. 1, a laser cutting apparatus according to the present invention includes a laser processor 10. The laser processor 10 has a laser oscillator 11 for generating a laser beam B and a laser condenser lens 12 for condensing the laser beam B to cut an object 20 being processed. A beam splitter 13 which alters the direction of the laser beam B, is installed between the laser oscillator 11 and laser condenser lens 12. Also, a laser condenser transporter 14 and a processing-speed regulator 15 are installed in the laser processor 10. The laser condenser transporter 14 is provided for adjusting the distance between the laser condenser lens 12 and the object 20 to control the width of the laser beam B irradiated onto the object 20. The object 20 may be relocated to adjust the distance from the laser condenser lens 12, as required. The processing-speed regulator 15 controls the relative speed of the object 20 with respect to the laser beam B to regulate the irradiating time of the laser beam B onto the object 20. Preferably, the relative speed of the object 20 with respect to the laser beam B is regulated by increasing or decreasing a movement speed of the object 20. The laser processor 10 further includes a power adjuster 16 for adjusting the intensity of the laser beam B from the laser oscillator 11. The laser processor 10 constructed as above is connected to a numerical control (NC) unit 30 which functions by controlling the operations of the power adjuster 16, laser condenser transporter 14 and processing-speed regulator 15 included in the laser processor 10. The numerical control unit 30 is connected to a controller 40 which, in turn, connected to an optical sensing unit 50. The optical sensing unit 50 for measuring a cutting width W of the object 20 consists of optical monitors 51a and 51b having optical monitoring sensors. Since the object 20 is transferred in accordance with data which is received into the numerical control unit 30 in advance, a portion perceivable by the optical sensing unit 50 can always be coincide with a cutting-off portion of the object 20. Two optical monitors 51a and 51b constituting the optical sensing unit 50 measure the cutting width W of the object 20 while alternately performing a swing operation. In more detail, the first optical monitor 51a measures the cutting width dimension with respect to a point P1 corresponding to the upper portion of the cutting width W of the object 20, and the second optical monitor 51b measures that with respect a point P2 corresponding to the lower portion thereof. Of course, the cutting width at the point P2 may be measured by the first optical monitor 51a, and that at the point P1 may be measured by the second optical monitor 51b. In place of the optical monitors 51a and 51b, only a single optical monitor capable of being moved to upper and lower portions of the object 20 is installed to alternately measure the cutting width W at the upper and lower portions of the object 20. A distance measuring lens is utilized as the optical monitors 51a and 51b, and any other instrument may be utilized provided that it can accurately measure the dimension of the cutting width W. A beam splitter 60 is installed obliquely between the optical sensing unit 50 and object 20 in the path of the laser beam B. The beam splitters 13 and 60, which are a kind of a reflection mirror, reflect the high-temperature laser beam B irradiated from the laser processor 10, but transmit a visible ray. By transmitting the visible ray, the cutting width W of the object 20 can be measured by the optical sensing unit 50. This reflection of the laser beam B by means of the beam splitter 60 protects the optical sensing unit 50. The reason of obliquely installing the beam splitter 60 is to prevent the accumulation of leavings such as slag and smoke caused by cutting the object 20. If a compressed air injection nozzle N is provided over the beam splitter 60, the slag falling upon the beam splitter 60 is more effectively eliminated. Too much leavings accumulated on the surface of the beam splitter 60 weakens the transmission force of the visible ray advancing toward the optical monitors 51a and 51b, thereby inducing troubles in monitoring the cutting width W. Accordingly, the beam splitter 60 should be maintained in a clean condition. Briefly, the optical sensing unit 50 measures the cutting width at the upper and lower portions of the cutting groove in the object 20 to supply the measured corresponding information to the controller 40. Then, the controller 40 displays the measured dimensions of the cutting width W from the optical sensing unit 50 on a monitor to allow the worker to easily check the cutting-off operation executed by means of the laser processor 10, and supplies signals determined in comparison with preset standard dimensions to the numerical control unit 30. Then, the numerical control unit 30 controls the power adjuster 16, laser condenser transporter 14 and processing-speed regulator 15 in response to the signal supplied from the controller 40. By this operation, the cutting width W with respect to the object 20 constantly maintains the standard dimension. At this time, a controlling procedure by the numerical control unit 30 for each example will be described in detail with respect to FIG. 2.

Figure 2A:
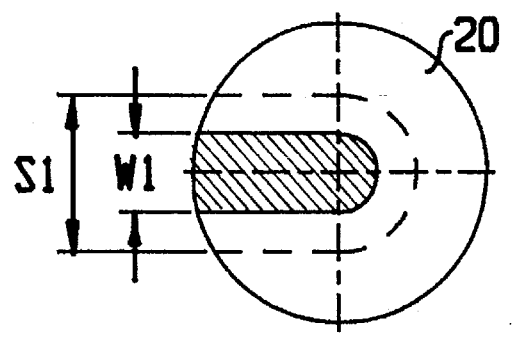
FIGS. 2A to 2C are views for showing the cutting-off states of the object to be measured by the optical sensing unit.
Figure 2B:
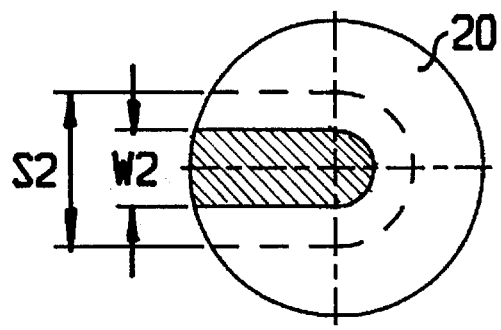
Figure 2C:
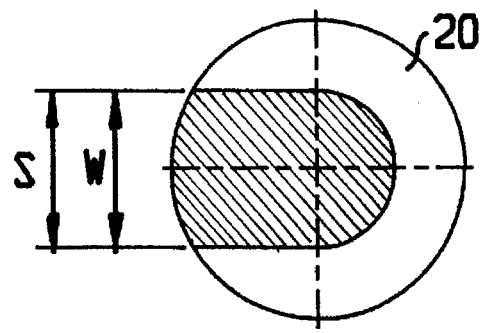

FIGS. 2A to 2C are views for illustrating the cutting-off states of the objects to be measured by the optical sensing unit. Respective examples of FIGS. 2A to 2C will be separately explained below.

OPERATIONAL EXAMPLE 1

The measurement is performed at the point P1 of
FIG. 1.

<When the actual cutting width is smaller than the standard dimensions>

As shown in FIG. 2A, when the actual cutting width W1 of the object 20 is smaller than the standard dimension S1 set in the controller 40, the swinging (or moving up and down) first optical monitor 51a monitors the state. Then, the measured data with respect to the cutting width W1 is supplied to the controller 40 which compares to determine the measured dimension of the cutting width W1 from the first optical monitor 51a with the previously-received standard dimension S1. The information compared to be determined by the controller 40 is supplied to the numerical control unit 30. Until the cutting width W1 becomes congruous with the standard dimension S1, the numerical control unit 30 continuously controls the laser condenser transporter 14 to upwardly transfer the laser condenser lens 12 as designated by a virtual line of FIG. 1. As the laser condenser lens 12 further moves upwardly, the width of the laser beam B contacting the upper portion of the object 20 is increasingly enlarged. In other words, the upper portion of the object 20 is widely cut little by little, so that the cutting width W1 is congruous with the standard dimension S1 at a prescribed point. Once the upper cutting width W1 of the object 20 becomes correspondent to the standard dimension S1, this state is continuously maintained.

<When the actual cutting width is larger than the standard dimension>

Contrary to the above example, when it is measured that the actual cutting width W1 of the object 20 is cut larger than the standard dimension S1, the numerical control unit 30 controls the laser condenser lens transporter 14 to gradually lower the laser condenser lens 12 upon the surface of the object 20. Thus, the width of the laser beam B contacting the upper portion of the object 20 is gradually decreased to thereby reduce the cutting width W1 at the upper portion of the object 20. Once the cutting width W1 of the upper portion of the object 20 is congruous with the standard dimension S1 during proceeding the foregoing operation, this state is continuously maintained.

OPERATIONAL EXAMPLE 2

The measurement is performed at the point P2 of
FIG. 1.

<When the actual cutting width is smaller than the standard dimension>

As shown in FIG. 2B, when the cutting-off operation is executed under the state that the actual cutting width W2 of the object is smaller than the standard dimension S2 preset to the controller 40, the swinging second optical monitor 51b of the optical sensing unit 50 quickly monitors the state. Then, the measured data with respect to the cutting width W2 is supplied to the controller 40 which compares to determine the measured cutting width W2 from the second optical monitor 51b with the previously-received standard dimension S2. The information compared to be determined by the controller 40 is supplied to the numerical control unit 30 that automatically controls the laser processor 10. The numerical control unit 30 controls the processing-speed regulator 15 to slow the movement speed of the object 20, and controls the power adjuster 16 to raise the output of the laser beam B from the laser oscillator 11. The reason of raising the output of the laser beam B is to more intensely irradiate the laser beam B to the point P2, i.e., the lower portion of the object 20. Meantime, the reason of slowing the movement speed of the object 20 is to decrease the relative speed of the object 20 with respect to the laser beam B, so that the laser beam B is irradiated upon the cut portion of the object for a long time. Once the cutting width W2 at the lower portion of the object 20 is congruous with the standard dimension S2 during proceeding the foregoing operation, this state is continuously maintained.

<When the actual cutting width is larger than the standard dimension>

Contrary to the above example, when the actual cutting width W2 of the object 20 is larger than the standard dimension S2, the numerical control unit 30 controls the processing-speed regulator 15 in accordance with the data measured by the optical sensing unit 50 to gradually quicken the movement speed of the object 20, and controls the power adjuster 16 to gradually lower the output of the laser beam B from the laser oscillator 11. Once the actual cutting width W2 at the lower portion of the object 20 is congruous with the standard dimension S2 during proceeding the foregoing operation, this state is continuously maintained.

OPERATIONAL EXAMPLE 3

The standard dimension is congruous with the cutting width.

As shown in FIG. 2C, if the actual cutting width W of the object 20 is within a permissible error of the standard dimension S, the controller 40 controls the numerical control unit 30 to continuously maintain a current state (e.g., the output of the laser oscillator, distance between the condenser lens and object, and a processing speed with respect to the object).

Since the corrected particulars as described above with reference to the operational examples can be displayed on the monitor which receives the signal from the controller, the worker can easily confirm the proceeding slates of the changed details of the cutting width and cutting-off operation.

Figure 3:
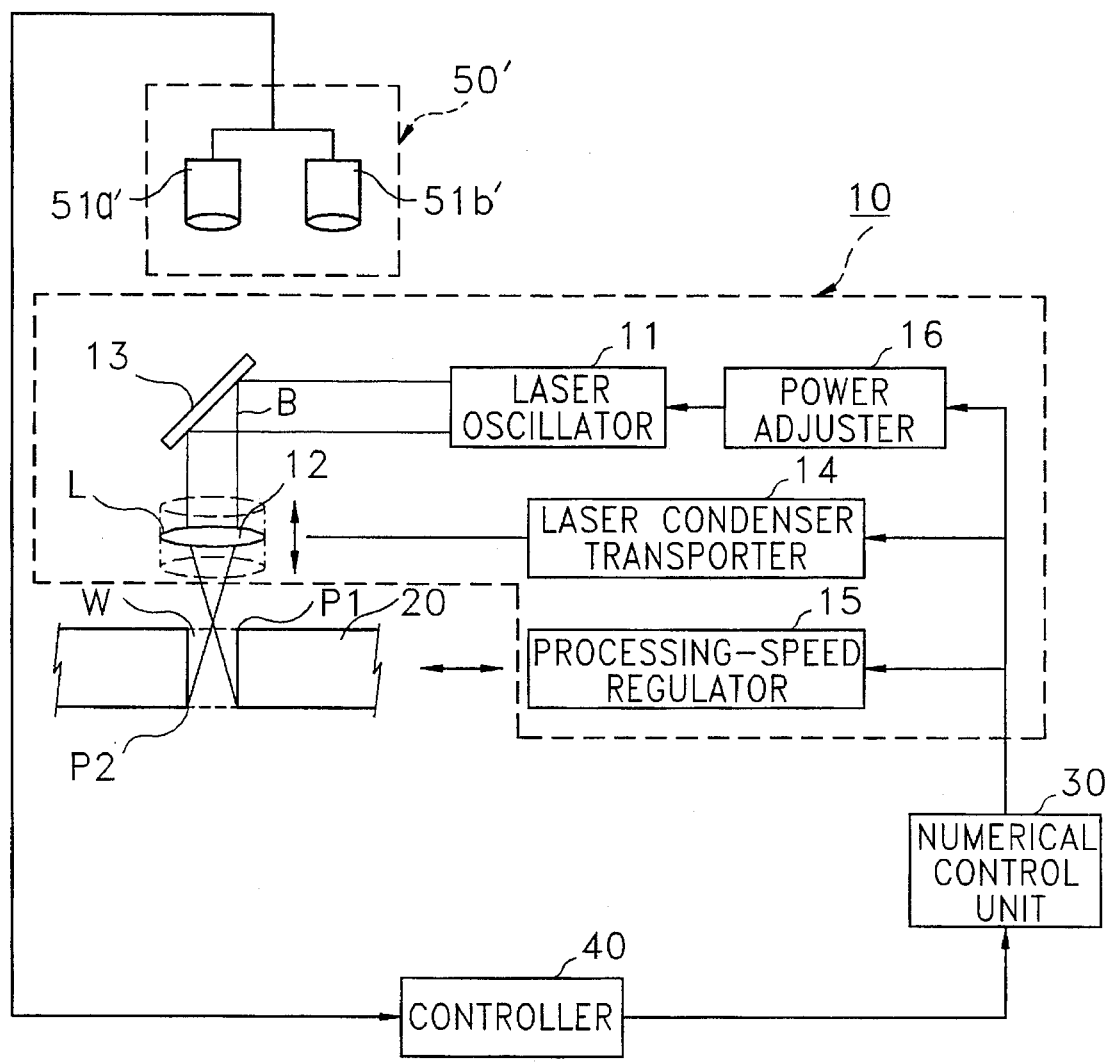
FIG. 3 is a block diagram showing another embodiment of the laser cutting apparatus according to the present invention.

FIG. 3 is a block diagram showing another embodiment of the laser cutting apparatus according to the present invention, in which the parts identical to those of FIG. 1 are designated by the same reference symbols. As noted in FIG. 3, an optical sensing unit 50' is installed in the upper portion of the beam splitter 13 positioned over the object 20, which is opposed to that of one embodiment shown in FIG. 1. In this case, the optical sensing unit 50' is not stained by the leavings such as slag produced during the cutting-off operation of the object 20 executed by means of the laser beam B. The other operation is the same as FIG. 1, which thus will be omitted.

Figure 4:
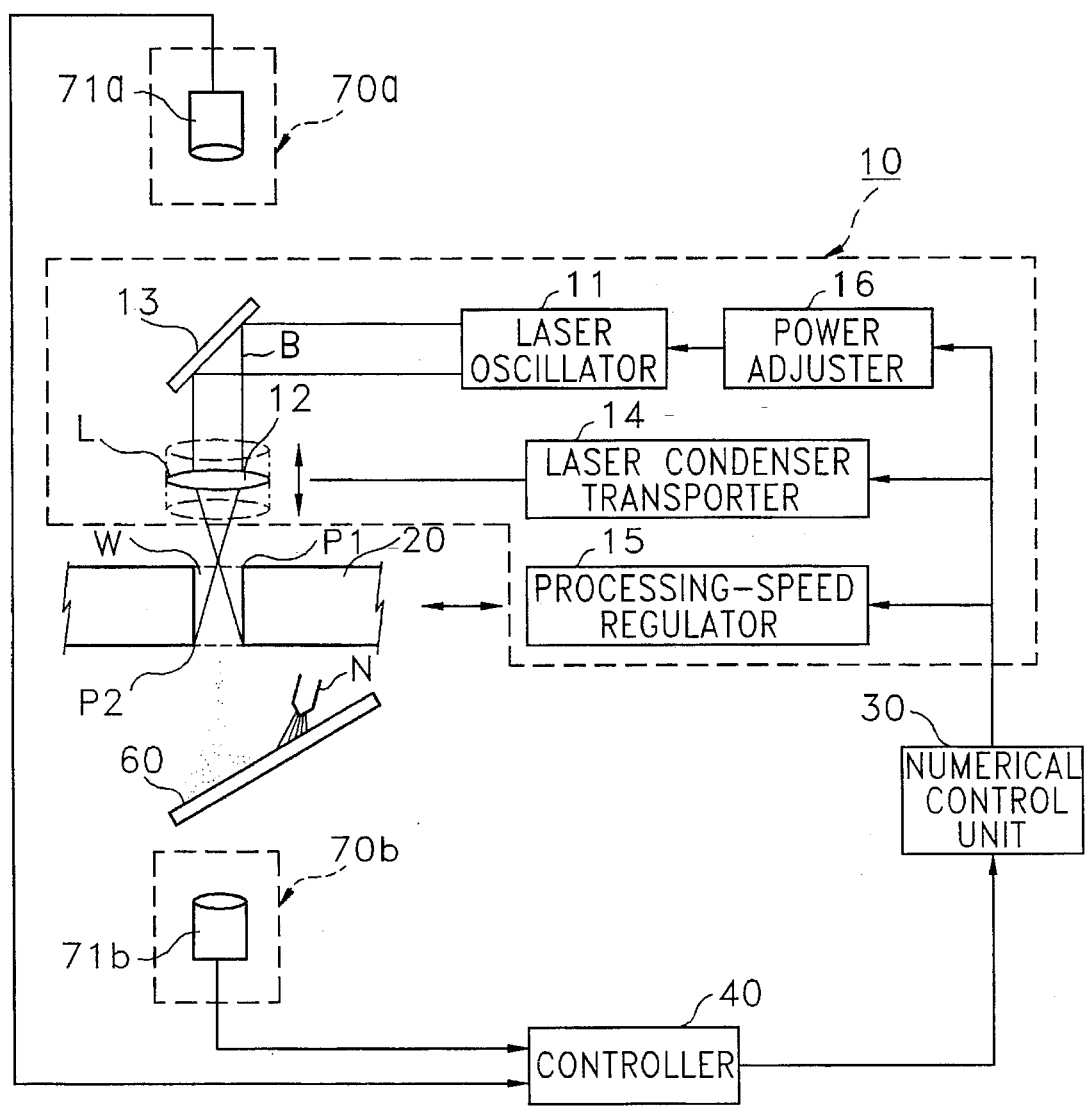
FIG. 4 is a block diagram showing still another embodiment of the laser cutting apparatus according to the present invention.

FIG. 4 is a still another embodiment of the laser cutting apparatus according to the present invention, in which the parts identical to those of FIGS. 1 and 3 are designated by the same reference symbols. As noted in FIG. 4, optical sensing units 70a and 70b are respectively provided to the upper and lower sides of the object 20, and connected to the controller 40. The optical sensing unit 70a on the upper side of the object 20 measures the cutting width W at the point P1, i.e., the upper portion of the object 20, while the optical sensor 70b on the lower side of the object 20 measures the cutting width W at the point P2, i.e., the lower portion of the object 20. Optical monitors 71a and 71b of the optical sensing units 70a and 70b also measure the cutting width W of the object 20 in a fixed position, which is different from those of the embodiments illustrated in FIGS. 1 and 3. The other operation is the same as FIGS. 1 and 3, which thus will be omitted.

As a result, a laser cutting apparatus according to the present invention described with reference to FIGS. 1 to 4 can be utilized to facilitate the processing of a cutting groove with standard dimension into an object to be processed.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A laser cutting apparatus including a laser oscillator for generating a laser beam and a laser condenser lens for condensing said laser beam from said laser oscillator to make a cutting groove of predetermined width into an object being processed, said laser cutting apparatus comprising:

means for adjusting distance between said object and said laser condenser lens for adjusting the width of said laser beam irradiating upon said object;

relative-speed regulating means for controlling the relative speed of said object with respect to said laser beam to regulate the irradiating time of said laser beam upon said object;

cutting-width measuring means for measuring of an upper portion and a lower portion of said cutting groove; and controlling means for comparing the upper cutting width and the lower cutting width measured by said cutting-width measuring means, of said cutting groove with a standard dimension, and controlling said distance adjusting means and said relative-speed regulating means in accordance with the result of comparison.

2. The laser cutting apparatus as claimed in claim 1, further comprising power adjusting means for adjusting the intensity of said laser beam output from said laser oscillator in accordance with the result of the comparison carried out by said controlling means.

3. The laser cutting apparatus as claimed in claim 1, wherein said distance adjusting means adjusts the distance between said object and laser condenser lens by transferring said laser condenser lens in the up and down directions.

4. The laser cutting apparatus as claimed in claim 1, wherein said relative-speed regulating means adjusts the movement speed of said object to thereby control the relative speed of said object with respect to said laser beam.

5. The laser cutting apparatus as claimed in claim 1, wherein said cutting-width measuring means are optical monitors for respectively measuring said upper and lower widths, provided with optical sensors.

6. The laser cutting apparatus as claimed in claim 1, wherein said cutting-width measuring means is installed at the upper side of said object and is capable of being moved far from and near to said object.

7. The laser cutting apparatus as claimed in claim 1, wherein said cutting-width measuring means is installed at the lower side of said object and is capable of being moved far from and near to said object.

8. The laser cutting apparatus as claimed in claim 1, wherein said cutting-width measuring means are installed at the upper and lower sides of said object, respectively.

9. The laser cutting apparatus as claimed in claim 7, wherein a laser reflecting splitter is installed between said object and cutting-width measuring means located at the lower side of said object.

10. The laser cutting apparatus as claimed in claim 9, wherein a compressed air injection nozzle is further installed at the upper side of said laser reflecting splitter for eliminating leavings accumulated onto said laser reflecting splitter.

11. The laser cutting apparatus as claimed in claim 2, wherein said controlling means includes means which controls said relative-speed regulating means and said power adjusting means to increase the relative speed of said object with respect to said laser beam and to decrease the intensity of said laser beam when the measured cutting width at the lower portion of said cutting groove is larger than said standard dimension, and controls said relative-speed regulating means and said power adjusting means to decrease the relative speed of said object with respect to said laser beam and to increase the intensity of said laser beam when the measured cutting width at the lower portion of said cutting groove is smaller than said standard dimension.

12. The laser cutting apparatus as claimed in claim 3, wherein said controlling means controls said distance adjusting means to lower said laser condenser lens when the measured cutting width at the upper portion of said cutting groove is larger than said standard dimension, and controls said distance adjusting means to raise said laser condenser lens when the measured cutting width at the upper portion of said cutting groove is smaller than said standard dimension.

13. The laser cutting apparatus as claimed in claim 8, wherein a laser reflecting splitter is installed between said object and cutting-width measuring means located at the lower side of the object.

14. The laser cutting apparatus as claimed in claim 13, wherein a compressed air injection nozzle is further installed to the upper side of said laser reflecting splitter for eliminating leavings accumulated onto said laser reflecting splitter.

15. A laser cutting apparatus including a laser oscillator for generating a laser beam and a laser condenser lens for condensing said laser beam from said laser oscillator to make a cutting groove of predetermined width into an object being processed, said laser cutting apparatus comprising:

means for adjusting distance between said object and said laser condenser lens for adjusting the width of said laser beam irradiating upon said object;

relative-speed regulating means the controlling the relative speed of said object with respect to said laser beam to regulate the irradiating time of said laser beam upon said object;

cutting-width measuring means for measuring the cutting widths of a proximal portion of said cutting groove, relative to said measuring means, and a distal portion of said cutting groove, relative to said measuring means; and controlling means for comparing the upper cutting width and the lower cutting width, measured by said cutting-width measuring means, of said cutting groove with a standard, and controlling said distance adjusting means and said relative-speed regulating means in accordance with the result of comparison.

\* \* \* \* \*